Jan. 30, 1934.  S. J. NORDSTROM  1,944,995
VALVE
Filed Nov. 26, 1929
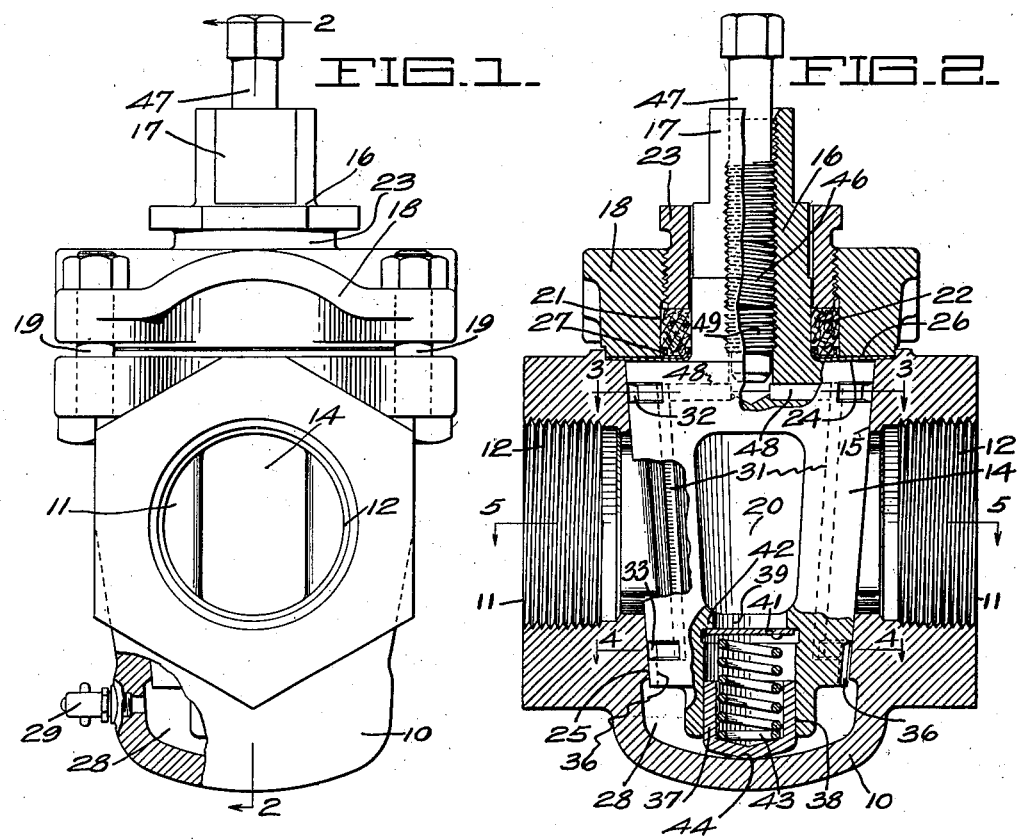
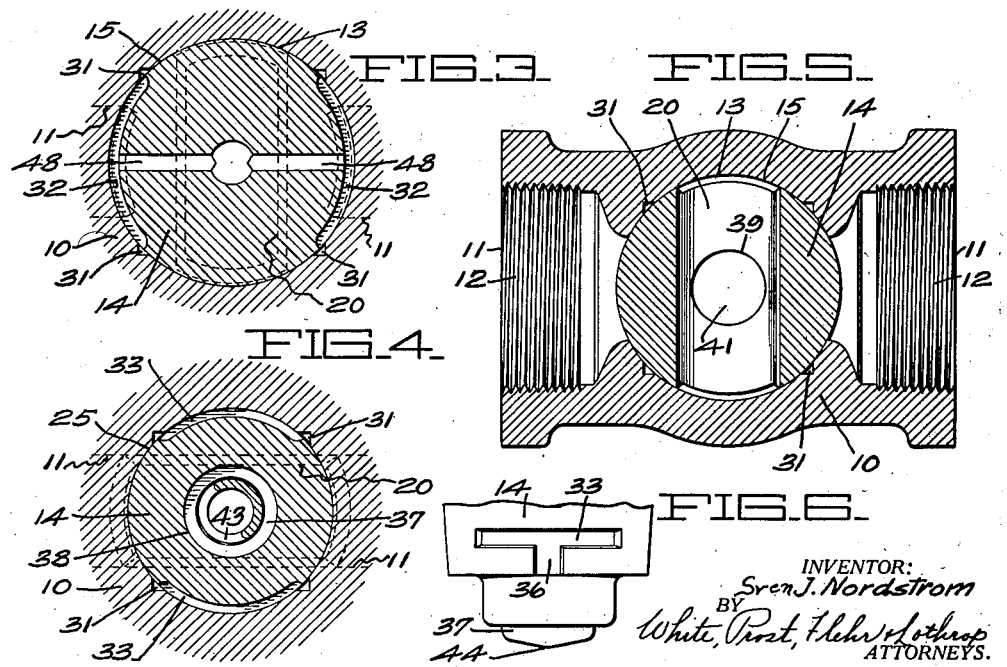
INVENTOR:
Sven J. Nordstrom
BY White, Prost, Flehr & Lothrop
ATTORNEYS.

Patented Jan. 30, 1934

1,944,995

UNITED STATES PATENT OFFICE 1,944,995

VALVE

Sven Johan Nordstrom, Piedmont, Calif., assignor to Merco Nordstrom Valve Company, San Francisco, Calif., a corporation of Delaware Application November 26, 1929
Serial No. 409,876

6 Claims. (Cl. 251—93)

This invention relates generally to valves of the rotatable plug type, and particularly valves having provision whereby lubricant can be supplied to the valve working surface.

It is an object of the present invention to devise a valve of the above character having novel means for maintaining a supply of lubricant under pressure, whereby the valve will be automatically lubricated over a long operating period.

It is a further object of this invention to devise an improved lubricated valve of the plug type characterized by a spring pressed piston or equivalent means for maintaining a charge of lubricant under pressure, and which will also cause lubricant leaking by the piston to be conducted to the line.

It is a further object of this invention to devise a valve of the above character which is simple in construction, and which can be readily manufactured and assembled.

Further objects of the invention will appear from the following description in which the preferred embodiment of the invention has been set forth in connection with the accompanying drawing. It is to be understood that the appended claims are to be accorded a range of equivalents consistent with the state of the prior art.

Referring to the drawing:

Figure 1 is an end view of a valve incorporating the invention, a portion of the valve body being broken away.

Fig. 2 is a cross section taken along the line 2—2 of Fig. 1.

Fig. 3 is a cross sectional view taken along the line 3—3 of Fig. 2.

Fig. 4 is a cross sectional view taken along the line 4—4 of Fig. 2, but showing the rotatable plug in a different operating position.

Fig. 5 is a cross sectional view taken along the line 5—5 of Fig. 2.

Fig. 6 is a detail showing the construction of one end of the rotatable plug member.

In the construction of lubricated valves of the rotatable plug type, it has been found practical to provide a charge of lubricant maintained under pressure, whereby the lubricant is automatically fed to the valve working surfaces, thus making frequent servicing of the valve unnecessary. In the present invention, the lubricant is maintained under pressure by means which is characterized by a certain amount of lubricant leakage, which escapes from the lubricant chamber or chambers. By means of the novel construction herein disclosed, such lubricant leakage is conducted to the hole in the rotatable plug member, from which it is carried away by the fluid flowing thru the valve.

Referring to the drawing, the embodiment of the invention illustrated consists of a valve casing 10, having a passageway 11 for flow of fluid. The ends of casing 10 are threaded as indicated at 12, or are otherwise formed for convenient connection with fluid pipes or conduits. The casing is also formed to provide a bore 13 extending transversely of passageway 11, and rotatably disposed within this bore, there is a plug member 14. The plug member 14 has a hole 20 adapted to register with passageway 11 for open position of the valve. The cooperating space between the outer periphery of plug member 14 and the valve casing 10 has been indicated at 15, and may be considered as formed by valve working surfaces. In the particular embodiment illustrated, plug member 14 and bore 25 are tapered, so that if the plug member becomes fast within the valve casing, as for example thru accumulation of sediment from the line or because of corrosion, it can be loosened by longitudinal jacking movement, as will be presently explained.

In order to permit turning of plug member 14, I have shown a stem 16 or equivalent member, connected to the upper end of plug member 14, and provided at its outer end with a squared portion 17 for attachment of a handle or wrench. Suitable means is provided for sealing the space between the stem or operating member 16, and the main body of valve casing 10. This means can consist of a plate 18, secured to the body of valve casing 10 by suitable means such as bolts 19. Plate 18 is provided with an annular bore 21 adapted to surround stem 16, and positioned within the space between stem 16 and bore 21, there is a suitable packing ring 22. A gland member 23 has a threaded engagement with plate 18, and can be screwed down to press against the upper face of packing 22. Interposed between the lower face of packing 22 and the upper end face 24 of plug member 14, there is an annular diaphragm 26, made of suitable material such as resilient sheet metal. The outer peripheral portion of annular diaphragm 26 is securely clamped between plate 18 and the adjacent face of the body of valve casing 10, thus providing a sealed engagement. The inner peripheral portion of diaphragm 26, is pressed down into engagement with surface 24, by the packing 22. It may be noted at this point that packing 22 is preferably of resilient compressible material. In order to properly confine packing 22, and to prevent this packing from extruding between diaphragm 26 and the lower face of plate 18, the lower face of packing 22 is preferably seated within an annular ring 27, this ring being made of suitable material such as pressed sheet metal, and being preferably formed with a channel shaped cross section as shown in Fig. 2. The pressure applied to packing 22 by gland 23 should be sufficient to normally prevent leakage and to hold the plug member in proper position relative to bore 13.

In order to store a charge of lubricant, a chamber 28 has been shown at the lower end of the plug member 14. As representative of suitable means for introducing a charge of lubricant under pressure into chamber 28, there is shown a conventional lubricant fitting 29, threaded within the body of valve casing 10. Fittings of this character are commonly utilized in the lubricant art, and are adapted for making detachable connection to a lubricant gun or other source of lubricant under pressure. They are provided with suitable check valves to prevent back flow of lubricant after introduction.

Lubricant chamber 28 is of course in communication with the valve working surfaces. In order to aid in distribution of lubricant, I preferably provide lubricant grooves or channels, in communication with chamber 28 and interrupting the working surfaces. The particular arrangement of channels shown is similar to that disclosed in Reissue Patent No. 17,375. It consists of longitudinal grooves 31 formed in the valve casing 10, and cooperating with upper and lower transverse grooves 32 and 33 formed in the rotatable plug member 14. When the plug member 14 is in closed position, as shown in Figs. 2 and 3, transverse grooves 32 and 33 are in communication with all of the longitudinal grooves 31. Likewise a similar communication is effected when the plug member is in open position, as represented in Fig. 4. However while the plug member is being rotated from open to closed position, the longitudinal grooves 31 which are exposed to the line pressure are cut off from communication with grooves 32 and 33. For open and closed positions of the plug member, it will be noted that groovess 31, 32 and 33 form channels substantially surrounding the valve casing passageway 11. In order to establish communication between chamber 28 and the above described grooves or channels, grooves 36 are formed in the lower portion of plug member 14, these grooves serving to connect grooves 32 with the lubricant chamber.

For maintaining lubricant in chamber 28 under pressure following its introduction, thus causing the lubricant to be fed continually to the working surfaces over a long operating period, I have shown a member associated with plug 14 and movable relative to the same to effect a variation in the volumetric capacity of chamber 28. The member associated with plug member 14 is in the form of a piston 37, slidably disposed within a cylinder bore 38, this bore being formed in the lower end portion of plug member 14. The space within cylinder 38 upon the upper side of piston 37 is in communication with the hole 20 in plug member 14, by means of a port or aperture 39.

In order to prevent sediment or foreign material from the fluid of the line from entering thru port 39 and accumulating within the cylinder bore 38, I preferably provide a closure member in the form of a disc 41. The peripheral portion of disc 41 is seated upon a shoulder 42, provided immediately below port 39. Suitable means such as a compression spring 43, is imposed between disc 41 and piston 37. This spring normally urges piston 37 in a direction to decrease the volumetric capacity of chamber 28, and also serves to retain disc 41 upon shoulder 42. The lower face of piston 37 is preferably conical shaped as indicated at 44, to provide a minimum of friction when in contact with the adjacent surface of valve casing 10. As optional means for introducing lubricant under pressure into chamber 28, there is shown a bore 46 formed axially of stem 16, and threaded to receive a screw 47. Passages 48 in the plug member 14, serve to connect bore 46 with the upper transverse grooves 32. A suitable check valve 49 can be provided to prevent back flow of lubricant, or flow of fluid from the line, when screw 47 is removed. To introduce lubricant by this means, screw 47 is removed to permit introduction of lubricant in stick form into bore 46, after which screw 47 is turned down upon the lubricant to force it thru check valve 49, thru passages 48, into grooves 31, 32 and 33.

In operating the above described valve, fairly viscous lubricant is introduced into chamber 28, either by turning down screw 47, or by introducing the lubricant thru fitting 29. A sufficient amount of lubricant is introduced to force piston 37 upwardly within the cylinder bore 38, and against the compression of spring 43. Lubricant also fills grooves 31, 32 and 33 to adequately lubricate the working surfaces, thus affording easy turning of the plug member 14 and preventing leakage of the line pressure. Thereafter, a supply of lubricant to the valve working surface is maintained over a long operating period, since piston 37 continually presses against the lubricant in chamber 28, thus maintaining the lubricant under sufficient pressure to continually feed it to the valve working surfaces. When a sufficient amount of lubricant has been displaced from the chamber to permit piston 37 to contact with the adjacent portion of valve casing 10, a new charge of lubricant is introduced. If the plug member becomes stuck or fast to the valve casing, lubricant can be introduced into chamber 28 under sufficient pressure to jack the plug member, or in other words to effect a certain amount of longitudinal movement relative to the valve casing. It may be noted that a certain amount of longitudinal movement of the plug member is permitted by virtue of the resilient diaphragm 26, and the resilient compressible packing 22. When the plug member is being jacked, the fluid pressure required within chamber 28 is generally sufficient to force piston 37 upwardly until it engages with the lower face of disc 41.

After the valve has been in use for a considerable period, a certain amount of lubricant will have leaked by the piston 37, and will accumulate above the piston within the cylinder bore 38. If such lubricant leakage is permitted to accumulate above piston 37, without provision for its removal, it might interfere with proper functioning of the piston to maintain constant lubricant pressure. With the construction of the present invention, such lubricant leakage is conducted to the hole 20 of plug 14, thru port 39. In this connection it is to be noted that disc 41 does not have a sealed engagement with shoulder 42, but permits extrusion of lubricant between the disc and shoulder. Lubricant which is conducted thru port 39 is of course carried away by the fluid flowing thru the valve.

This application is a continuation in part of my copending application Serial No. 278,422, filed May 17, 1928.

I claim:

1. In a valve, a casing having a passageway therethrough for flow of fluid and a bore formed transversely of the passageway, a plug member rotatably disposed within said bore and having a hole adapted to register with the passageway, a lubricant chamber formed within the plug, a piston slidably fitted within said chamber, one side of said piston forming a wall of said chamber, a port in the plug adapted to communicate between said chamber and the hole in the plug, a closure member extending across said port, and a compression spring interposed between said closure member and said piston.

2. A valve comprising, a casing having a passageway therethrough and a tapered seat formed transversely of the passageway, a tapered plug mounted in the seat and having a hole adapted to register with the passageway, the casing being provided with a chamber into which the small end of the plug projects, a cylinder formed in the part of the plug projecting into the chamber, a piston mounted to slide in the cylinder, a spring acting on one side of the piston to urge the piston in the direction of the small end of the plug, the tapered surface of the plug being provided with longitudinal channels communicating with said chamber at the other side of the piston, and means for forcing lubricant under pressure through the channels and into said chamber to act against said other side of the piston to compress the spring, the spring acting to force the lubricant back into the channels during the operation of the valve.

3. A valve comprising a casing having a passageway therethrough and a seat or bore formed transversely of the passageway, a valve plug rotatably disposed in said bore, the casing forming a closure across one end of the seat or bore and also being formed to provide a lubricant chamber at the end of the plug adjacent said closure, a recess formed in said end of the plug, a movable member mounted in said recess and wholly within the casing, a spring acting between the plug and the piston and serving to urge the piston towards said chamber, and lubricant channels interrupting the valve working surfaces and in communication with said chamber.

4. A valve comprising a casing having a passageway therethrough and a tapered seat formed transversely of the passageway, a tapered valve plug rotatably disposed in said seat, the casing forming a closure across the small end of the seat and also being formed to provide a lubricant chamber at the small end of the plug, a cylinder formed in the small end of the plug, a movable piston mounted in said cylinder and wholly within the casing, a spring acting between the plug and the piston and serving to urge the piston towards said chamber, and lubricant channels interrupting the valve working surfaces and in communication with said chamber.

5. A valve comprising a casing having a passageway therethrough and a tapered seat formed transversely of the passageway, a tapered valve plug rotatably mounted in said seat and having a hole therethrough adapted to register with the passageway, the casing forming a closure across the small end of the seat and also being formed to provide a lubricant chamber at the small end of the plug, a cylinder formed axially in the small end of the plug, one end of said cylinder having communication with said chamber and the other end thereof having communication with the hole through the plug, a piston slidably disposed within said cylinder and wholly within the casing, a spring acting between the piston and the plug and serving to urge the piston towards said chamber, and lubricant channels interrupting the valve working surfaces and in communication with the said chamber, lubricant leakage past said piston being permitted to flow into the port in said plug by virtue of the communication between said cylinder and said hole.

6. A valve comprising, a casing having a passageway therethrough and a tapered seat formed transversely of the passageway, a tapered plug mounted in the seat and having a hole adapted to register with the passageway, the casing being provided with a chamber into which the small end of the plug projects, a cylinder formed in the part of the plug projecting into the chamber, a piston mounted to slide in the cylinder, a spring acting on one side of the piston to urge the piston in the direction of the small end of the plug, the tapered surface of the plug being provided with longitudinal channels communicating with the other side of the piston, and means for forcing lubricant under pressure through the channels to act against said other side of the piston to compress the spring, the spring acting to force the lubricant back into the channels during the operation of the valve.

SVEN JOHAN NORDSTROM.